US009710234B2

(12) United States Patent
Azrieli et al.

(10) Patent No.: US 9,710,234 B2
(45) Date of Patent: *Jul. 18, 2017

(54) GENERATING SOFTWARE CODE

(71) Applicant: International Business Machines Corporation, Armonk, NY (US)

(72) Inventors: Ilya Azrieli, Rehovot (IL); Eldad Palachi, Beer Yaakov (IL); Yura Zharkovsky, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/140,982

(22) Filed: Dec. 26, 2013

(65) Prior Publication Data

US 2015/0186117 A1    Jul. 2, 2015

(51) Int. Cl.
    *G06F 9/44*    (2006.01)
(52) U.S. Cl.
    CPC .................. *G06F 8/30* (2013.01); *G06F 8/20* (2013.01); *G06F 8/34* (2013.01)
(58) Field of Classification Search
    CPC ........................................................ G06F 9/44
    USPC ................................ 717/104, 105, 106–109
    See application file for complete search history.

(56) References Cited

U.S. PATENT DOCUMENTS

| | | | | |
|---|---|---|---|---|
| 6,233,726 B1* | 5/2001 | Bowman et al. | ............. | 717/107 |
| 6,714,219 B2* | 3/2004 | Lindhorst | ................. | G06F 8/34 |
| | | | | 715/746 |
| 7,254,687 B1* | 8/2007 | Jeter, Jr. | .................. | G06F 9/526 |
| | | | | 711/163 |
| 7,496,843 B1* | 2/2009 | Russell | ..................... | G06F 8/24 |
| | | | | 715/234 |
| 7,543,267 B2 | 6/2009 | Lindhorst et al. | | |
| 7,765,529 B1* | 7/2010 | Singh | ........................ | G06F 8/34 |
| | | | | 717/134 |
| 8,881,127 B2* | 11/2014 | Mizrachi et al. | ............. | 717/162 |
| 2002/0147763 A1* | 10/2002 | Lee | ............................ | G06F 8/24 |
| | | | | 709/202 |
| 2002/0170033 A1* | 11/2002 | Chen | ................... | G06F 11/3624 |
| | | | | 717/124 |
| 2003/0101433 A1* | 5/2003 | Allison | ................. | G06F 9/4428 |
| | | | | 717/116 |
| 2003/0135792 A1* | 7/2003 | Chen | ................... | G06F 9/44589 |
| | | | | 714/38.1 |
| 2004/0025110 A1* | 2/2004 | Hu | ........................ | G06F 19/321 |
| | | | | 715/234 |
| 2004/0193575 A1* | 9/2004 | Chen | ................. | G06F 17/30607 |

(Continued)

OTHER PUBLICATIONS

IBM, "Method and Means to generate code from through visual editing in a Common Information Model (CIM) based programming environment." An IP.com Prior Art Database Technical Disclosure, Apr. 2013, 6 pages.

*Primary Examiner* — Jae Jeon
(74) *Attorney, Agent, or Firm* — Cantor Colburn LLP; Maeve Carpenter

(57) ABSTRACT

A technique for generating code includes detecting, via a processor, a selected model element. The technique also includes detecting, via the processor, a copy operation corresponding to the selected model element. The technique further includes detecting, via the processor, a selected copy option associated with the copy operation, and generating software code based on the copy option.

5 Claims, 4 Drawing Sheets

(56) References Cited

U.S. PATENT DOCUMENTS

| | | | |
|---|---|---|---|
| 2005/0050122 A1* | 3/2005 | Blumenthal | G06F 7/582 708/250 |
| 2005/0060687 A1 | 3/2005 | Ghazaleh | |
| 2005/0203958 A1* | 9/2005 | Mitchell | G06F 9/4433 |
| 2006/0075403 A1* | 4/2006 | Haselden | G06F 8/315 718/100 |
| 2006/0080603 A1* | 4/2006 | Bailey et al. | 715/530 |
| 2006/0104306 A1* | 5/2006 | Adamczyk | H04L 67/24 370/466 |
| 2006/0206863 A1 | 9/2006 | Shenfield et al. | |
| 2007/0168929 A1 | 7/2007 | Larvet | |
| 2008/0082959 A1* | 4/2008 | Fowler | G06F 8/24 717/104 |
| 2010/0131918 A1* | 5/2010 | Bailey | G06F 8/74 717/105 |
| 2012/0192144 A1* | 7/2012 | Jalaldeen | G06F 8/51 717/104 |

\* cited by examiner

200

300

GENERATING SOFTWARE CODE

BACKGROUND

The present disclosure relates to generating software code, and more specifically, to generating software code based on a copy operation.

SUMMARY

According to an embodiment described herein, a method is provided. The method includes generating software code by detecting, via a processor, a selected model element and detecting, via the processor, a copy operation corresponding to the selected model element. The method also includes detecting, via the processor, a selected copy option associated with the copy operation, and generating software code based on the copy option.

In another embodiment, a system is provided. The system includes a memory device includes a processor executable instructions and a processor. The processor detects a selected Unified Model Language (UML) model element. The processor also detects a copy operation corresponding to the selected UML model element. The processor further detects a selected copy option associated with the copy operation, and generates software code based on the copy option.

According to another embodiment described herein, a computer program product for generating software code includes a computer-readable storage medium having program code embodied therewith. The program code is executed by a processing circuit to detect a selected UML model element and detect a copy operation corresponding to the selected UML element. The program code also detects, via the processing circuit, a selected copy option associated with the copy operation, and generates, via the processing circuit, software code based on the copy operation and the selected copy option.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

According to embodiments, a computing device generates software code based on a copy operation. A copy operation, as referred to herein, includes any operation that can generate software code based on a model element. A model element, as referred to herein, includes any data related to a feature of a system being modeled. For example, a model element may include an actor, a class, an object, a package, or a state, among others. In some embodiments, the model elements can be based on the Unified Modeling Language (UML), which is a standardized general-purpose modeling language used for software engineering. The model elements based on UML can be related to data modeling, business modeling, object modeling, and component modeling, among others.

In some embodiments, the copy operation can detect a selected model element that is to be copied. The copy operation may also include any suitable number of copy options that indicate software code is to be generated based on portions of the selected model element. The various copy options that can be included in a copy operation are described in greater detail below in relation to FIG. 1.

Figure 1:
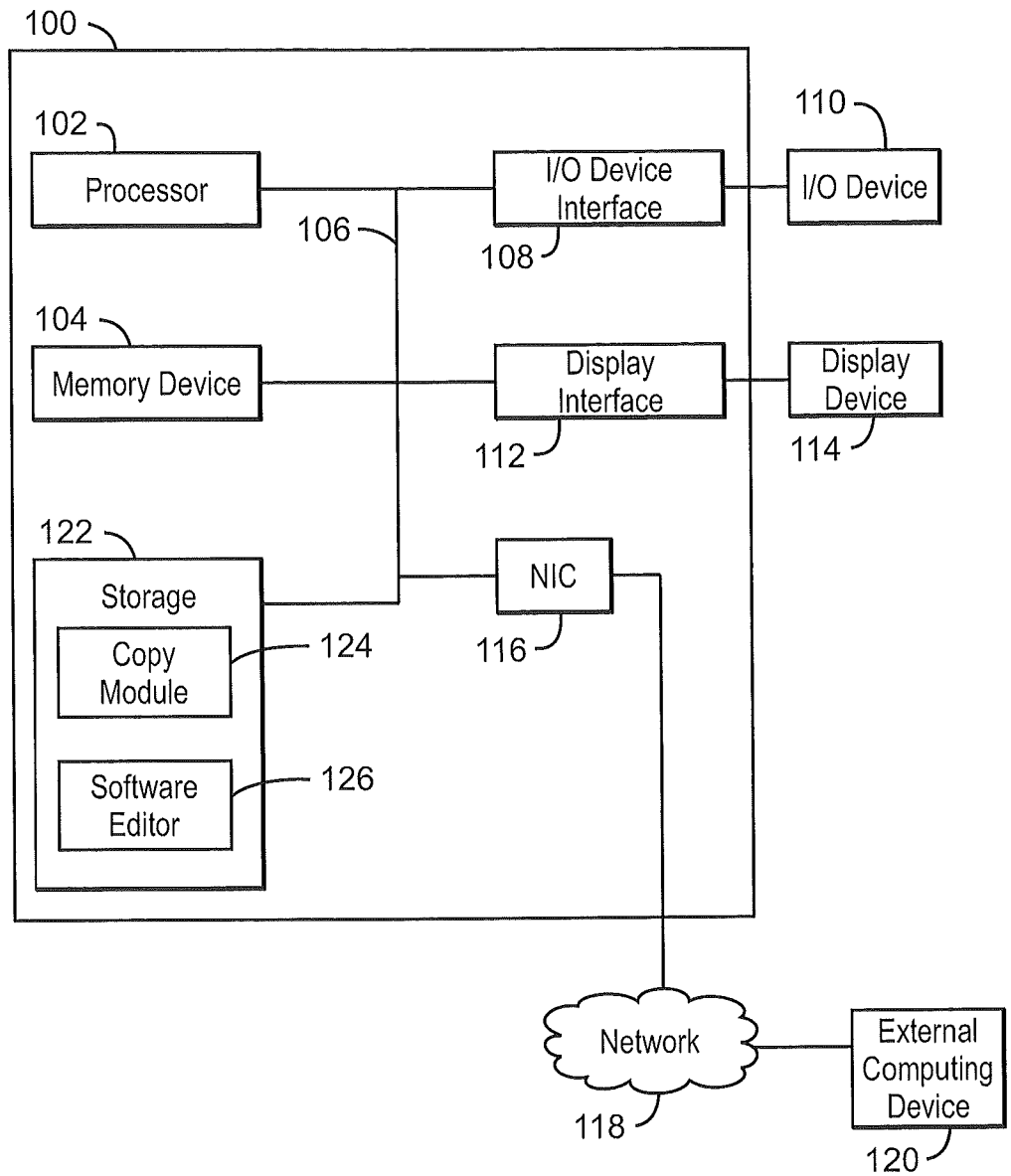
FIG. 1 is an example of a computing device configured to generate software code in accordance with an embodiment.

FIG. 1 is an example of a computing device that can generate software code. The computing device 100 may be for example, a desktop computer, laptop computer, tablet computer, or smartphone. The computing device 100 may include a processor 102 that is adapted to execute stored instructions, a memory device 104 that can store said instructions. The processor can be a single-core processor, multi-core processor, computing cluster, or any number of other configurations. The memory 104 can include random access memory (RAM), read only memory, flash memory, or any other suitable memory systems. The instructions executed by the processor 102 may be used to implement a method that can generate software code.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (also referred to herein as a NIC) 116 may be adapted to connect the computing device 100 through the system interconnect 106 to a network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118.

The processor 102 may also be linked through the system interconnect 106 to a storage device 122 that can include a hard drive, an optical drive, a USB flash drive, an array of drives, or any combinations thereof. In some examples, the storage device 122 can include a copy module 124 that can detect the selection of a model element. The copy module 124 may also detect the selection of any suitable copy option and generate software code based on the selected copy option and the selected model element. In some examples, the copy module 124 can detect a selected copy option from a software editor 126. A software editor 126, as referred to herein, can include any suitable application that can generate software code such as UML code, among others. In some embodiments, the software editor 126 can display the generated software code.

In some embodiments, the copy module 124 can display a list of copy options and detect the selection of one copy operation from any suitable number of copy options included in the list. In some examples, a copy option may include copying a reference to a selected model element. A reference, as referred to herein, can include any suitable software code that identifies a selected model element. In some embodiments, a reference can include identifying a name that is to be associated with a class, an object, or any suitable selected model element, among others. In some examples, the reference can include a namespace for a class.

In some embodiments, a copy option may include copying a reference and attributes associated with a selected model element. An attribute, as referred to herein, can include any suitable properties associated with a model element. For example, an attribute may include properties associated with a queue size of a model element, or properties associated with a class in a model element such as the number of instances of a class that may be generated, among others.

In some embodiments, a copy option may also include copying a reference, attributes, and sub-elements (also referred to herein as nested elements) associated with a selected model element. A sub-element, as referred to herein, can include any suitable source code associated with a model element. In some embodiments, sub-elements can assign values to variables in a model element, detect return values for a model element, and modify properties of variables in a model element, among others. In some embodiments, the copy option can also include generating a foreach function based on nested elements associated with the selected model element. A foreach function, as referred to herein, can include any suitable source code that is executed for any suitable number of nested elements or sub-elements within the selected model element. In some embodiments, the copy operation that includes a foreach function can enable software to be generated for each nested element in a model element. In some embodiments, a nested element can share the same scope and namespace as the selected model element.

In some embodiments, the copy module 124 can insert the generated software code into the software editor 126 at any suitable location. For example, the copy module 124 may insert the generated software code 126 at the location in the software editor 126 that corresponds to the location of a cursor.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the copy module 124 may be partially, or entirely, implemented in hardware and/or in the processor 102. For example, the functionality may be implemented with an application specific integrated circuit, or in logic implemented in the processor 102, among others.

Figure 2:
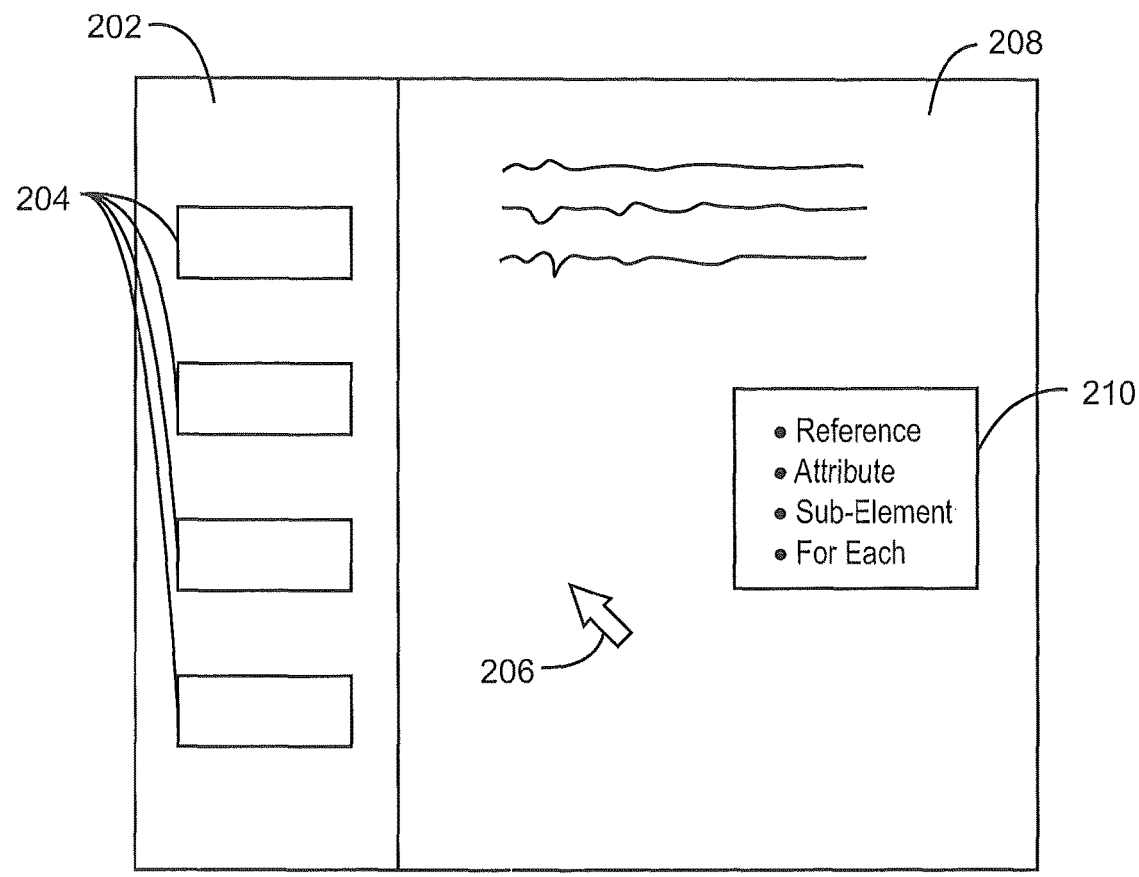
FIG. 2 is a graphical user interface illustrating an example software editor configured to generate software code in accordance with an embodiment.

FIG. 2 is a graphical user interface illustrating an example software editor that can generate software code. In some examples, the software editor 200 includes the copy module 124 and the software editor can be executed with any suitable computing device, such as the computing device 100 of FIG. 1. In some examples, the software editor 200 can be a browser, such as an Eclipse browser, or any other suitable browser. For example, the software editor 200 may include the copy module 124 in the form of a plugin for a browser. In some embodiments, the software editor 200 may be displayed on the display device 114.

In some embodiments, the software editor 200 can display a list of model elements in a navigation panel 202 and software code in an editor window 208. In some examples, the software editor 200 may detect a selected model element 204 from the list of model elements 202. The software editor 200 may detect the selection of a model element 204 from any suitable I/O device 110, such as a keyboard or pointing device, among others. In some examples, the list of model elements 202 can include UML model elements that include classes, objects, packages, segments of code, or any other suitable software code. A class, as referred to herein, can include any suitable construct that can define a data type that may include any suitable number of data field members and methods. An object, as referred to herein, can include any suitable memory location with a value and an identifier. In some examples, an object can be a variable, a function, or a data structure, among others. A package, as referred to herein, can include a namespace that can group any suitable number of model elements together. In some examples, each list of model elements 202 can be included within a package and share a common namespace.

In some embodiments, a copy model 124 detects that a cursor 206, which is controlled through an I/O device 110, selects a model element 202 and drags the model element 202 into the editor window 208. In some examples, the copy module 124 can also detect if a model element 202 is dropped into the editor window 208. For example, the copy module 124 can detect the dropping of a model element 202 in the editor window 208 when the cursor 206 is released.

In some embodiments, the copy module 124 can display a dialog window 210 in response to detecting a dropped model element 202 in the editor window 208. In some examples, the dialog window 210 can be a pop-up window that can be displayed within the software editor 200. The dialog window 210 can be used for a variety of purposes, such as enabling the selection of a copy option that indicates the software code to be generated. For example, as discussed above, the copy module 124 may generate software code based on a selected copy option related to references for model elements, attributes for model elements, sub-elements for model elements, and foreach functions corresponding to model elements, among others. In some examples, the copy option may generate software code in any suitable programming language or environment, such as Rhapsody Java Api code, among others. The generated software code may be displayed in the editor window 208 at any suitable location based on a position of the cursor 206 or any other suitable location.

It is to be understood that the block diagram of FIG. 2 is not intended to indicate that a software editor 200 is to include all of the components shown in FIG. 2. Rather, the software editor 200 and the copy module 124 may include fewer or additional components not illustrated in FIG. 2.

Figure 3:
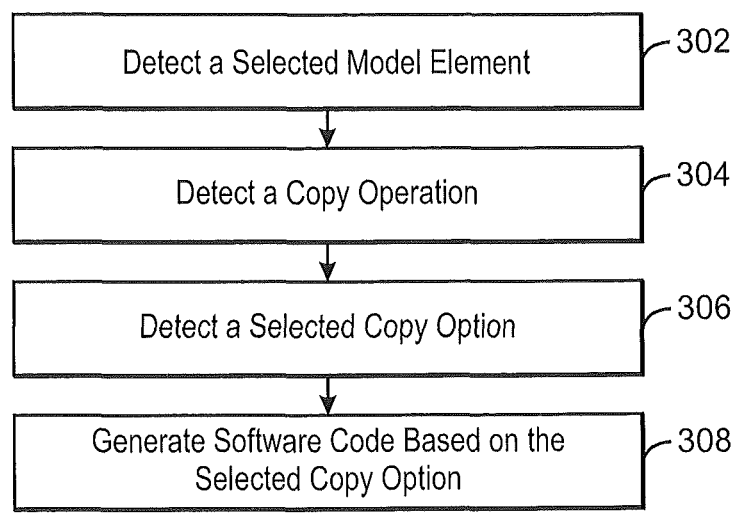
FIG. 3 is an example block diagram of a system for generating software code in accordance with an embodiment.

FIG. 3 is a process flow diagram illustrating an example method for generating software code. The method 300 can be implemented with any suitable computing device, such as the computing device 100 of FIG. 1.

At block 302, the copy module 124 can detect a selected model element, such as a UML model element, among others. In some embodiments, the copy module 124 can detect the selection of a model element from any suitable input device such as a keyboard, a mouse, or a gesture enabled device, among others. In some examples, the copy module 124 can detect the selection of a model element within a navigation panel. For example, a software editor may include a navigation panel that is displayed within any portion of a display device. The navigation panel may include any suitable number of model elements listed by name, or model elements related to a package, and the like. In some examples, the copy module 124 can detect that a model element in a navigation panel has been selected if the model element has been selected for a period of time that exceeds a threshold value.

At block 304, the copy module 124 detects a copy operation corresponding to the selected model element. In some embodiments, the copy module 124 can detect the copy operation by detecting a selected model element is dragged and dropped to another location within a software editor. For example, as discussed above, a selected model element may be dragged from a navigation panel in a software editor to an editor window within the software editor. In some embodiments, the copy module 124 can display a dialog window that provides a list of copy options in response to detecting a copy operation.

At block 306, the copy module 124 can detect a selected copy option associated with the copy operation. As discussed above, the copy operation can include any suitable number of copy options. In some examples, the copy options can include copying a reference to a selected model, or copying a reference and attributes associated with a selected model element. For example, an attribute may include properties associated with a queue size, properties associated with a class such as the number of instances of a class that may be generated, among others. In some embodiments, a copy option may also include copying a reference, attributes, and sub-elements associated with a selected model element. In some examples, sub-elements can assign values to variables, detect return values for the selected model element, and modify properties of variables, among others. In some embodiments, the copy option can also include generating a for each function based on sub-elements associated with the selected model element.

At block 308, the copy module 124 can generate software code based on the copy operation, the selected copy option, and/or the selected model element. In some embodiments, the copy module 124 can insert the generated software code in the software code displayed in an editor window of a software editor. In some embodiments, the copy module 124 can generate software code that includes a for each function that includes software code for each sub-element or nested element in a model element. The copy module 124 may also generate software code that includes any suitable reference, attribute, or sub-element associated with a selected model element.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

As will be appreciated by one skilled in the art, embodiments may be implemented as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
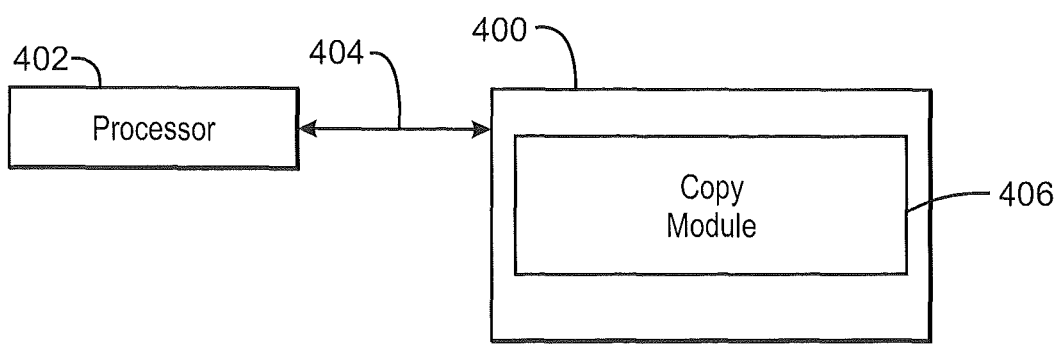
FIG. 4 is an example of a block diagram depicting an example of a tangible, non-transitory computer-readable medium configured to generate software code in accordance with an embodiment.

Referring now to FIG. 4, a block diagram is depicted of an example of a tangible, non-transitory computer-readable medium that can generate software code. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a copy module 406 may be adapted to direct the processor 402 to detect a selected model element and copy option and generate code based on the selected copy option and selected model element. It is to be understood that any number of additional software components not shown in FIG. 4 may be included within the tangible, non-transitory, computer-readable medium 400, depending on the specific application.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory device comprising processor executable instructions; and
a processor configured to:
detect a selected UML model element;
detect a copy operation corresponding to the selected UML model element;
detect a selected copy option associated with the copy operation, wherein the selected copy option indicates that a reference, an attribute, and a subset of sub-elements of a plurality of sub-elements associated with the selected UML model element are to be copied, wherein the attribute indicates a maximum number of permitted instantiations of a class in the selected UML model element, and wherein the selected copy option further indicates that a foreach function is to be generated for the subset of sub-elements; and
generate software code based at least in part on the copy option, wherein the software code comprises the foreach function, and wherein the foreach function is executed for only the subset of sub-elements.

2. The system of claim 1, wherein the attribute is a first attribute, and wherein the selected copy option further indicates a second attribute that includes properties associated with a queue size.

3. The system of claim 1, wherein at least one sub-element of the subset of sub-elements is configured to perform at least one of: assigning values to variables, detecting return values for the selected UML model element, or modifying properties of variables.

4. The system of claim 1, wherein the processor is further configured to detect a location to insert the generated software code based on a dragging of the selected UML model element from a navigation panel to an editor window.

5. The system of claim 1, wherein the generated software code is Java API code.

* * * * *